May 12, 1953  R. C. HORNE ET AL  2,638,292
COCKPIT SEALING SYSTEM
Filed March 7, 1951  2 Sheets-Sheet 1
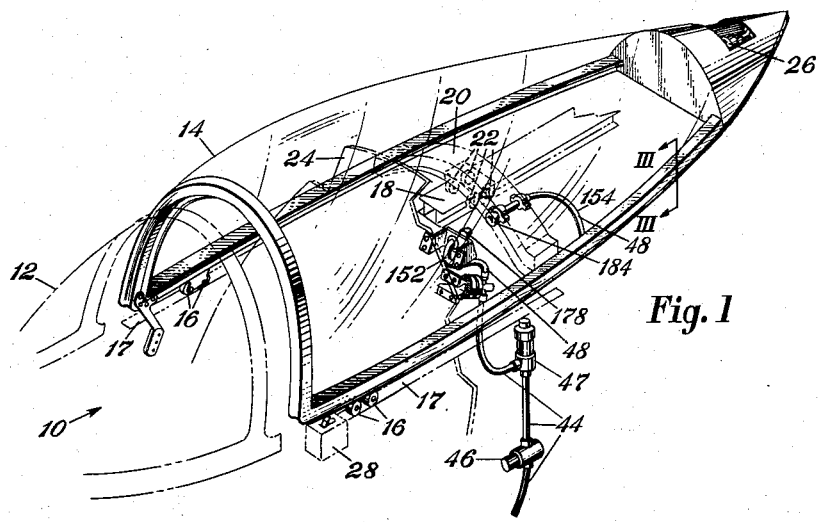
Fig. 1
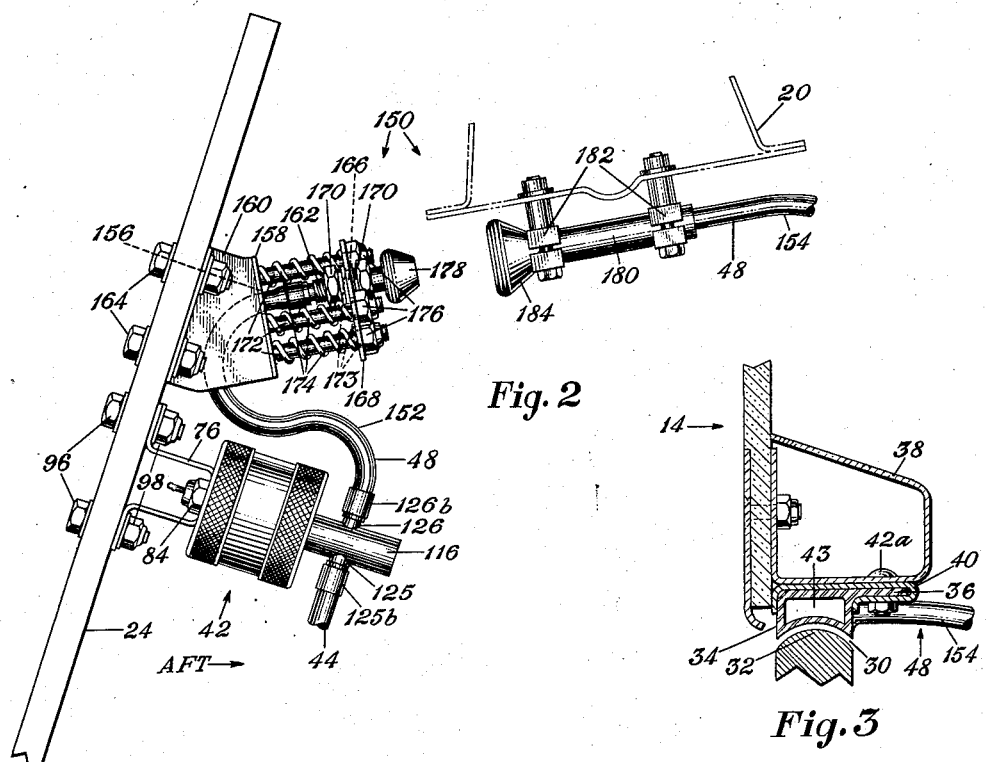
Fig. 2
Fig. 3
INVENTOR.
Richard C. Horne
David F. Stoddard
BY
Attorney May 12, 1953  R. C. HORNE ET AL  2,638,292
COCKPIT SEALING SYSTEM
Filed March 7, 1951  2 Sheets-Sheet 2

INVENTOR.
Richard C. Horne
David F. Stoddard
BY
Attorney

Patented May 12, 1953

2,638,292

UNITED STATES PATENT OFFICE 2,638,292

COCKPIT SEALING SYSTEM

Richard C. Horne, Dallas, and David F. Stoddard, Arlington, Tex., assignors to United Aircraft Corporation, East Hartford, Conn., a corporation of Delaware Application March 7, 1951, Serial No. 214,322

5 Claims. (Cl. 244—121)

This invention relates to aircraft and more particularly to sealing systems for hermetically sealing the joint between a closure and a fixed structure, such as the joint between the cockpit canopy and the fuselage of an aircraft.

While it is necessary to pressurize the cockpit cabin in a modern aircraft which is designed to fly at high altitudes, the cockpit canopy in the aircraft must be capable of being easily opened and closed under normal conditions at low altitudes. However, at altitudes of around ten thousand feet or higher when the cockpit must be pressurized, it is necessary that there be an airtight seal between the movable cockpit canopy and the main aircraft structure in order to maintain the pressurized condition of the cockpit cabin. It has been a problem to provide a suitable airtight seal between the movable cockpit canopy and the contiguous fuselage. Moreover, since aircraft pilots must operate a great many varied systems, particularly in military aircraft, it is advisable that as many ordinary systems be automatically controlled as possible in order to free the pilot's attention for non-routine duties. The system for making the seal between the canopy and the fuselage airtight when the cockpit is to be pressurized should, therefore, operate automatically.

This invention provides a novel system for automatically effecting an airtight seal between the canopy of an aircraft and the aircraft fuselage. It includes a pressure line leading from a source of pressurized gas in the aircraft, for example, a compressor, through a filter and reducing valve to the inlet port of a barometric valve. The valve contains a damper or gate secured to a Sylphon type bellows and in response to variations in ambient pressure, regulates the flow of gas to a hollow expansible tube or bead of rubber or rubber-like material extending around the periphery of the cockpit in the space between the canopy and the fuselage. The valve is set to automatically open and close at pre-set altitudes. When the canopy is closed and latched, the valve opens at a set altitude and compressed air is allowed to flow into the rubber bead. This expands the bead which thereby fills the space between the canopy and the fuselage and forms an airtight seal between them. When the valve closes upon the aircraft's descent to a lower altitude, the air in the bead is allowed to escape deflating the bead. When the bead is deflated, there is again a space between the canopy and the fuselage. This permits easy movement of the canopy with a minimum of frictional resistance and wear on the expansible bead.

It is an object of this invention to provide a means for hermetically sealing the joint between a closure for an aperture in a fixed structure and the fixed structure.

It is an object of this invention to provide a means for hermetically sealing an aircraft cockpit.

Another object of this invention is to provide a means for automatically providing a hermetic seal between the sliding section of an aircraft canopy and the contiguous stationary aircraft fuselage at any predetermined altitude.

Yet another object of this invention is to provide a means for automatically breaking the hermetic seal between an aircraft movable canopy and the contiguous aircraft fuselage at any preselected altitude thereby allowing the canopy to be easily opened with a minimum amount of frictional resistance and wear on the sealing means.

Other objects and advantages will be apparent from the specification and claims, and from the accompanying drawings which illustrate an embodiment of the invention.

In the drawings:

Fig. 1 is a perspective view of a portion of an aircraft cockpit, an aircraft cockpit movable canopy, and the hermetic sealing system of the invention for sealing the joint between the cockpit and the canopy;

Fig. 2 is a side view on a larger scale of the barometric valve and the means for connecting the pressure line mounted on the aircraft fixed structure to the pressure line mounted on the aircraft canopy movable section, the pressure lines being shown in disconnected positions;

Fig. 3 is a cross-sectional view of the expansible tube and the aircraft structure contiguous thereto taken along line III—III of Fig. 1 with the expansible bead in a collapsed condition;

Figure 4:
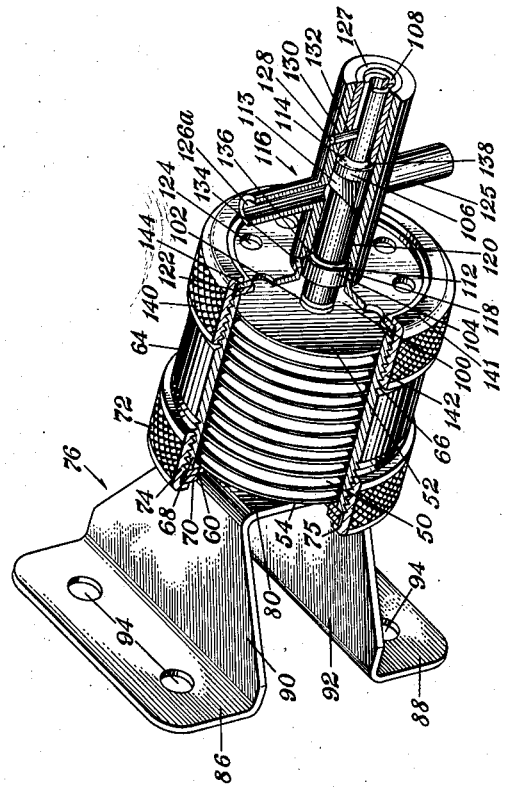
Fig. 4 is a perspective view on a larger scale of the barometric valve with a portion thereof cut away.

Fig. 1 indicates the cockpit section of an airplane fuselage 10 having a windshield 12 and a sliding enclosure or canopy 14. The canopy is mounted to the airplane structure on each side of its forward end by means of pairs of rollers 16 which engage the tracks 17 longitudinally disposed on each side of the cockpit section. The canopy is also attached at a point along a longitudinal center line and intermediate its fore and aft ends to the double track assembly 18 by the canopy carrier generally indicated at 20. The canopy carrier 20 is a rigid part of the canopy 14 and has secured to it rollers 22 which engage in the track assembly 18 thereby permitting the canopy to be rolled fore and aft to open and close the cockpit. The track assembly 18 is attached at its aft end to the airplane structure and at its forward end to the fuselage bulkhead 24.

The canopy 14 is actuated by mechanism 26 which is fully described in Patent No. 2,607,551, dated August 19, 1952, assigned to the assignee of the present application. The canopy 14 may be latched closed by latch mechanism generally indicated at 28 and which may be of a type described in the aforementioned Patent No. 2,607,551.

As shown in Fig. 3, the canopy 14 is mounted on the fuselage 10 so as to leave a space 30 between the canopy periphery and the fuselage edge 32 contiguous thereto in order that the canopy will be freely slidable. When the airplane flies at high altitudes and the cockpit must be pressurized, it is apparent that the space 30 must be closed and a hermetic seal provided between the canopy 14 and the fuselage edge 32. To effect these results an expansible hollow bead or tube 34 having a solid flange 36 is rigidly secured to the canopy frame structure 38 in a channel member 40 by bolts 42 extending through aligned apertures in the structure 38, member 40, and flange 36. Bead 34 extends around the periphery of the canopy and when the hollow cavity 43 is expanded, fills the space 30 thereby providing a hermetic seal between the canopy 14 and the surrounding fuselage edge 32. However, when bead 34 is in its normal state, i. e., when the hollow portion is not expanded, the space 30 is evident and movement of the canopy is unrestricted by friction between the bead around the canopy edge and the fuselage edge. Since it is obvious that this bead should never be expanded unless the canopy is closed and latched and that the canopy should not be moved unless the bead is deflated, it is apparent that no frictional wear of bead 34 will occur. Bead 34 may be attached to the canopy as shown or to the fuselage edge 32, and it may be endless or have hermetically sealed ends as design requirements may dictate. The bead may be caused to expand by the introduction of compressed gas from any suitable source of gas under pressure.

In order that the bead may be allowed to expand only when the aircraft is at or above a predetermined altitude at which the cockpit is to be pressurized, a barometric valve 42 is provided. Valve 42 is connected to a source of gas under pressure, such as a compressor (not shown), by a pressure line 44 which carries the gas through a conventional filter 46 and a pressure reducing valve 47. Leading from valve 42 is a pressure line 48 which is connected to the hollow bead 34 so as to convey from valve 42 pressurized gas into the hollow cavity 43.

Figure 5:
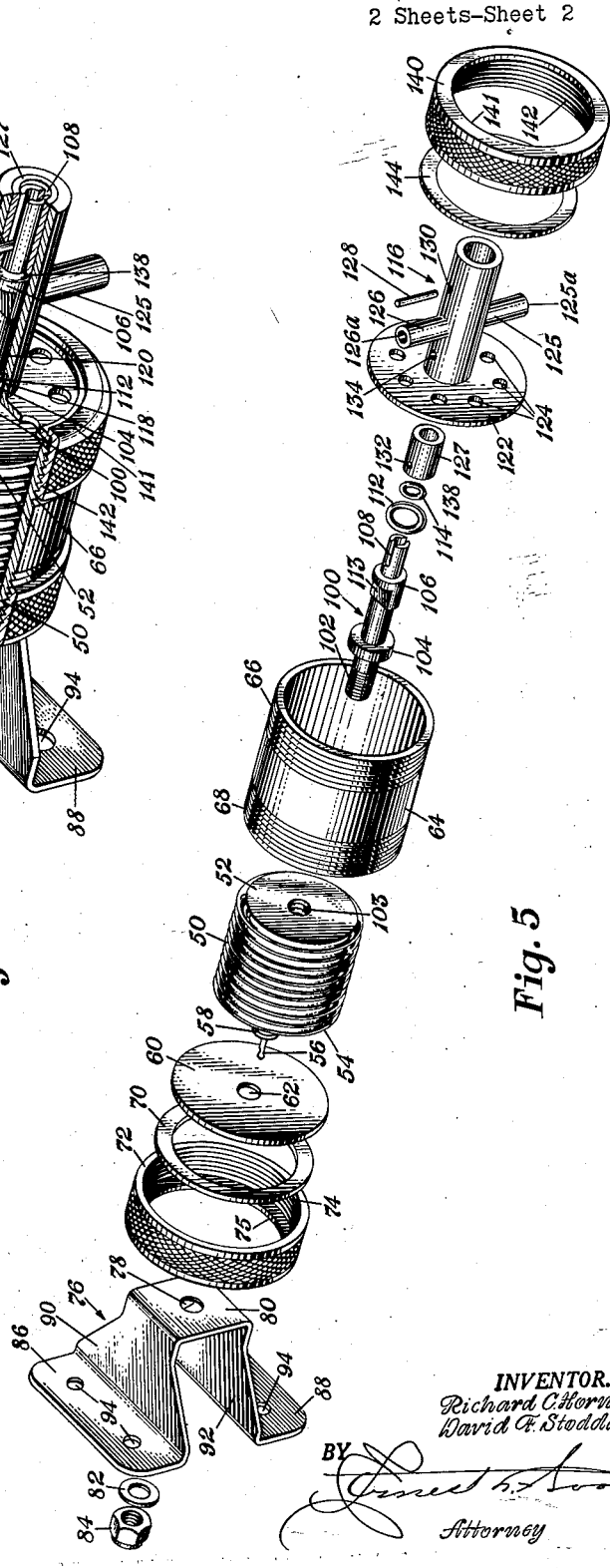
Fig. 5 is an exploded view of the barometric valve.

The components of the barometric valve 42 shown in Figs. 4 and 5 will be explained in the order of their assembly. The Sylphon type bellows 50 is cylindrical in shape having two flat ends 52 and 54. Bellows 50 contains gas under reduced pressure and is sealed at end 54 by a pinched tail segment 56 extending from a threaded member 58 contiguous to bellows end 54. Positioned against bellows end 54 is a flat disk 60 having a diameter greater than end 54 and containing an aperture 62 in its center through which the threaded member 58 and tail segment 56 protrude. A cylindrical sleeve 64 having an inner diameter less than that of disk 60, an outer diameter greater than that of disk 60, and a length greater than the bellows 50 encloses the bellows 50. Sleeve 64 has outside threaded portions 66 and 68 at each of its ends. A flat washer ring 70 having an outside diameter the same as that of disk 60 is positioned adjacent thereto. A rim 72 having an inner threaded portion 74 adapted to mesh with threaded portion 68 of sleeve 64 is positioned over ring 70 and disk 60 and is engaged with sleeve 64 thereby clamping disk 60 and ring 70 tightly between flange 75 of rim 72 and sleeve 64. A U-shaped bracket 76 for securing valve 42 to the aft side of bulkhead 24 has an aperture 78 in the base portion 80 of the U. Threaded member 58 extends through disk aperture 62, washer 70, rim 72, and bracket aperture 78 and is rigidly secured to bracket 76 by a washer 82 and locking nut 84 which is screwed on the threaded member 58. Bracket 76 has two flanges 86 and 88 which extend perpendicular to arms 90 and 92 respectively of the U-shaped bracket. These flanges 86 and 88 contain apertures 94 through which threaded bolts 96 (Fig. 2) extend to which nuts 98 are threaded to secure bracket 76 to bulkhead 24. By this means bellows 50 is rigidly secured within sleeve 64 and also rigidly secured to bulkhead 24.

A plunger 100 having a threaded end portion 102 which engages a threaded bore 103 provided in end 52 of bellows 50 has two radially extending flanges 104 and 106 located along its longitudinal axis. Through the non-threaded aft end of plunger 100 extends a vertical and axial slot 108. A resilient washer 112 having an outer diameter the same as flange 104 is positioned against the aft (right-hand) side of flange 104 as seen in Fig. 4. Flange 106 has a flat portion 113 on its uppermost side. Against the aft side of flange 106 is positioned a resilient washer 114 having an outer diameter the same as that of flange 106.

Valve member 116 has a main hollow cylindrical body, the forward portion 118 of which has a larger inner diameter than that of an aft portion 120. Member 116 has at its forward end an integral radially extending circular flange 122 which has an outer diameter the same as that of disk 60. In flange 122 are located a plurality of apertures 124. Integral with member 116 is a cylindrical hollow boss 125 for inlet port 125a which extends downwardly from the bottom surface of member 116 perpendicular to member 116's longitudinal axis. From the top surface of member 116 extends a similar outlet port boss 126 for outlet port 126a. Pressure line 44 from the compressor is rigidly and hermetically secured to boss 125 by a conventional coupling 125b (Fig. 2) and the pressure line 48 to the hollow bead is similarly connected to boss 126 by coupling 126b. A hollow cylindrical tube 127 is snugly fitted within the aft end of portion 120 of member 116 and is rigidly secured there by a pin 128 extending through aligned apertures 130 located in the top and bottom of member 116 and apertures 132 located in the top and bottom of tube 127. An exhaust aperture 134 extends through the upper wall of portion 118 of member 116.

Plunger 100 extends through member 116 which is positioned with its flanged portion 122 against the aft end of sleeve 64. The washer 112 is positioned between flange 104 of plunger 100 and a shoulder 136 which is caused by the difference in the inner diameters of portions 118 and 120. Washer 114 is positioned between flange 106 of plunger 100 and the end 138 of tube 127. The forward end 138 of tube 127 is secured within member 116 between the valve ports 125a and 126a and the aft end of member 116. The inner diameter of tube 127 is such as to allow the slotted end of plunger 100 to move easily within it, but having a close enough fit with plunger 100 so as to act as an aligning guide therefor. The pin 128 rides within slot 108 thereby keeping plunger 100 from turning about its longitudinal axis. Rim 140 has a flange 141 and an inner threaded portion 142 which meshes with threaded portion 66 of sleeve 64 and thereby secures washer 144 and the flanged portion 122 of member 116 to sleeve 64.

The opening and closing of the ports 125a and 126a and the exhaust aperture 134 is controlled by the degree of expansion or contraction of bellows 50. Plunger 100 is the damper or gate of valve 42 and moves along its longitudinal axis as bellows 50 expands or contracts, the threaded end 102 of plunger 100 being screwed into threaded bore 103 of bellows 50. Bellows 50 is actuated by the differential in pressure between that of the gas sealed within the bellows and the atmospheric pressure on the outside of the bellows. The atmospheric pressure acts upon bellows 50 through the apertures 124 of flange 122. The pressure at which valve 42 will open or close is controlled by the adjustment of plunger 100 within the bore 103. When bellows 50 expands, plunger 100 is caused to move aft (to the right in Fig. 5) thereby positioning flange 106 and washer 114 against end 138. This causes washer 114 to be deformed, sealing the space between flange 106 and end 138. Likewise, washer 112 forms a seal between flange 104 and shoulder 136. With the plunger 100 so positioned, ports 125a and 126a are open and exhaust aperture 134 is closed thereby allowing the pressurized gas entering through line 44 to pass through port 125a, the space provided between plunger 100 and the inner surface of member 116 in portion 120, port 126a, line 48 and into the hollow cavity 43 of bead 34. When bellows 50 contracts and plunger 100 is caused to move forward within member 116, flange 106 covers inlet port 125a, flange 104 uncovers aperture 134, and flat portion 113 of flange 106 is positioned under port 126a. When plunger 100 is in this position, port 125a is closed and the pressurized gas in the expansible bead is allowed to escape from hollow cavity 43 and line 48 through port 126a, between flat portion 113 of flange 106 and the inner surface of member 116 and exhausts to the atmosphere through aperture 134.

To illustrate the operation of the system, assume a hypothetical case where it is desired to pressurize the cockpit cabin of the aircraft when the atmospheric pressure corresponds to the pressure normal at an altitude of ten thousand feet. With the aircraft canopy 14 closed and latched, when the aircraft ascends to the altitude of ten thousand feet, the valve 42, having been set to open at that altitude, opens. Compressed air bled from the aircraft compressor is filtered by the filter 46 and has its pressure regulated to ten pounds per square inch by regulator valve 47. Valve 42 being open, the compressed air flows through it and line 48 into the hollow portion 43 of bead 34. Bead 34 is expanded by the compressed air and effects a hermetic seal between the movable canopy 14 and the fuselage edge 32. The independently operated cabin pressurizing system may now be actuated by the pilot to pressurize the cabin.

When the aircraft descends to below ten thousand feet valve 42 closes. The closing of valve 42 cuts off the compressed air from the compressor and opens the exhaust aperture 134. This allows the pressurized air in bead 34 and the connecting line 48 between the bead 34 and valve port 126a to exhaust through port 126a over portion 113 and out aperture 134. When the pressurized air is exhausted from bead 34, bead 34 assumes a collapsed position thereby breaking contact with edge 32 of the fuselage. The canopy may now be opened and closed easily and with no frictional wear of the expansible bead 34.

It will be noted that valve 42 may be located either inside or outside the cockpit pressurized area. If it is located outside, it is apparent that its operation will not be affected by the cockpit pressurization. Likewise, if it is located within the pressurized cockpit area, it will not be affected inasmuch as it is customary practice for the pilot not to pressurize the cockpit until the altitude having the critical atmospheric pressure at which the valve is to operate is exceeded and the cockpit is depressurized by the pilot on descending before that altitude is reached. In addition, the pressure in the pressurized cockpit area never exceeds the critical pressure value of the valve.

If the bead 34 is attached to the fuselage edge 32, any suitable type pressure line may be used to connect hollow cavity 43 of the bead directly to the valve, filter, and source of pressurized gas. If, however, the bead 34 is attached to the canopy edge as shown in the drawings, the problem of connecting the bead with the pressurized gas source and still allowing the canopy to remain movable is evident. A solution to this problem is the connection 150 between the two portions 152 and 154 of line 48 shown in Figs. 1 and 2. Portion 152 has one of its ends secured to boss 126 of valve 42 while its other end is positioned through an aperture 156 in the base plate 158 of a U-shaped bracket 160 and terminates in a threaded tubular member 162. Bracket 160 is rigidly secured to the aft side of bulkhead 24 by nuts and bolts 164 and resiliently supports member 162. Member 162 is positioned within an aperture 166 in a plate 168 and is there rigidly secured by nuts 170 threaded on member 162 on each side of plate 168. Three shafts 172 each having one of its ends rigidly secured to plate 158, extend perpendicularly aft therefrom. The other ends of shafts 172 are threaded and extend through aperture 173 in plate 168. A helical compression spring 174 is positioned around each of the shafts 172 in a pre-loaded condition between plates 158 and 168 and secured there by nuts 176 screwed on the threaded ends of shafts 172 on the aft side of plate 168. It is thus apparent that the end member 162 of the pressure line portion 152 is resiliently mounted on bulkhead 24. Member 162 has an annular male adapter 178 rigidly secured to its aft end.

The portion 154 of pressure line 48 terminates at one of its ends in bead 34 while its other end terminates in a tubular member 180. Member 180 is rigidly secured by a bracket 182 to the underside of the cockpit carrier 20 and terminates at its forward end in a rigidly secured annular female adapter 184. Adapters 178 and 184 may be made of resilient material such as rubber and are designed so as to mate when brought together. Adapters 178 and 184 are positioned so that then the canopy 14 is fully closed, adapter 184 presses against adapter 178 in a manner which will cause adapter 178 and consequently member 162 and plate 168 to travel forward further compressing springs 174. When the canopy is latched closed, springs 174 having been further compressed, will exert continuous pressure against plate 168 which will cause the adapters 178 and 184 to fit snugly within each other and effect a hermetic connection between the portions 152 and 154 of pressure line 48.

It is now apparent that this novel system can automatically effect a hermetic seal between the movable canopy section and the fuselage of an aircraft at any predetermined altitude. Likewise, this system can automatically break the hermetic seal at any predetermined altitude enabling the canopy to be easily movable with a minimum of frictional resistance.

It will be evident that various modifications are possible in the arrangement and construction of the components of the cockpit sealing system without departing from the scope of the invention as shown in the embodiment of the invention illustrated in the accompanying drawings.

What it is desired to be secured by Letters Patent is:

1. In an aircraft structure having an aperture communicating with an internal cavity: a closure for said aperture, a hollow expansible seal extending completely about said aperture and disposed between said closure and said structure; a source of gas under pressure; means for attaching said closure to said structure; tubing for conducting gas from said source to said hollow expansible seal whereby said seal expands to make an airtight joint between said closure and said structure, a valve in said tubing for opening and closing the same including a port having an inlet to said source of gas, a port having a connection with said tubing, a vent to the atmosphere and a plunger having a gate for controlling the flow of gas through said valve, and an atmospheric pressure responsive means connected to said plunger for moving the same whereby gas is admitted from said source to said tubing through said valve ports to inflate the tubing to form a hermetic seal between said closure and said structure in response to a predetermined atmospheric pressure and whereby gas is vented from said tubing through said vent to deflate said tubing in response to said predetermined pressure after said tubing has been inflated.

2. A sealing means for an airplane sliding cockpit canopy comprising: a source of pressurized gas in said airplane having an outlet, a valve responsive to atmospheric pressure associated with said outlet for controlling the flow of gas therethrough, a hollow expansible bead between the edge of said canopy and the contiguous airplane surface and having a gas inlet, a pair of mating connectors one of which is mounted on said sliding canopy and connected with said inlet, a mounting plate on said airplane for the other of said connectors for positioning the same in the path of movement of the first-mentioned connector, said other of said connectors having a connection with said outlet, and a resilient support for said mounting plate whereby a hermetic connection is formed between said connectors when said canopy is closed permitting said bead to be expanded by admission of said gas through said inlet to form a seal between said canopy and said airplane surface when said valve is opened in response to a predetermined atmospheric pressure.

3. A sealing means for an airplane sliding cockpit canopy comprising: a hollow expansible bead between the edge of said canopy and the contiguous airplane surface and having an inlet, a connector attached to said sliding canopy and having a connection to said inlet, a source of pressurized gas in said airplane having an outlet, a connector attached to said airplane in the path of the connector on said sliding canopy and having a connection with said outlet, a valve in said outlet having a gate mounted on a plunger extending externally of said valve, means operative in response to atmospheric pressure and operatively connected to said plunger for controlling the flow of said gas through said outlet, and yielding mounting means for said connector on said airplane whereby said connectors constitute a hermetic connection for the flow of said gas through said inlet to said bead for the expansion of the same when said canopy is moved to a position where said connectors are in contact and said valve is opened in response to a predetermined atmospheric pressure.

4. In a system of the character described: a fixed structure, a movable part movably attached to and cooperating with said fixed structure, a source of gas under pressure having an outlet, an expansible tube around the periphery of said movable part having a connection with said outlet, valve means in said outlet, atmospheric pressure responsive means for operating said valve means for inflating said tube thereby providing a hermetic seal between said movable part and said fixed structure, and means associated with said valve means and operated by said atmospheric pressure responsive means for deflating said tube thereby breaking said hermetic seal.

5. In a system of the character described: a fixed structure, a movable part designed to cooperate with said fixed structure, a source of gas under pressure, a hollow expansible tube attached to the periphery of said movable part, connecting means between said source and said tube, a valve in said connecting means having an externally extending operating plunger, means connected to said plunger and responsive to a predetermined pressure differential for controlling the passage of said pressurized gas through said connecting means, and means for breaking and uniting said connecting means whereby, when united and when said valve responds to said predetermined pressure differential pressurized gas will inflate said tube forming a hermetic seal between said fixed structure and said movable part.

RICHARD C. HORNE.
DAVID F. STODDARD.

References Cited in the file of this patent

UNITED STATES PATENTS

| Number | Name | Date |
|---|---|---|
| 754,467 | Lombard | Mar. 15, 1904 |
| 1,365,730 | Sager | Jan. 18, 1921 |
| 2,104,144 | Zand | Jan. 4, 1938 |
| 2,265,461 | Wagner | Dec. 9, 1941 |
| 2,361,298 | Laddon | Oct. 24, 1944 |

FOREIGN PATENTS

| Number | Country | Date |
|---|---|---|
| 528,124 | Great Britain | Oct. 23, 1940 |
| 548,778 | Great Britain | Oct. 23, 1942 |